April 28, 1970     R. L. SCHROEDER     3,508,832
ANGLE GENERATING SYSTEM

Filed March 1, 1966     3 Sheets-Sheet 1

INVENTOR
RICHARD L. SCHROEDER

BY
ATTORNEYS

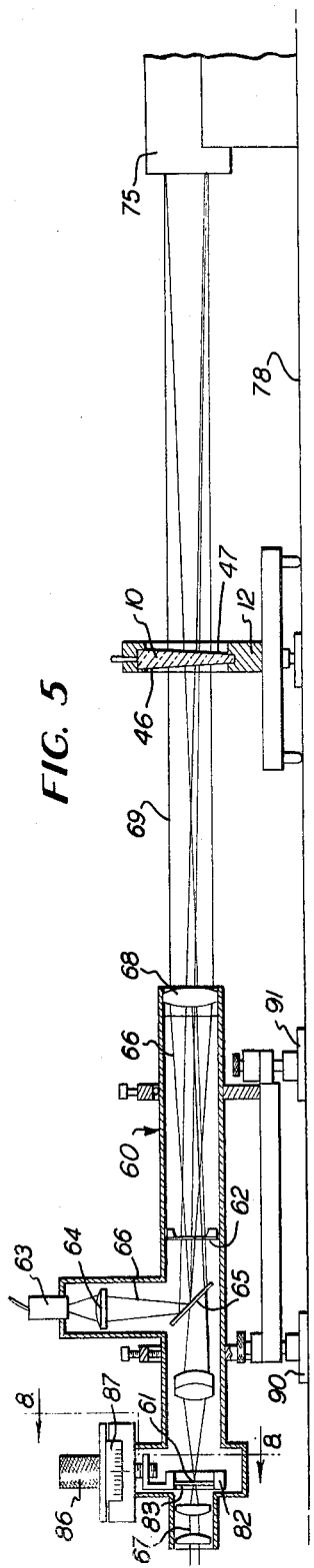
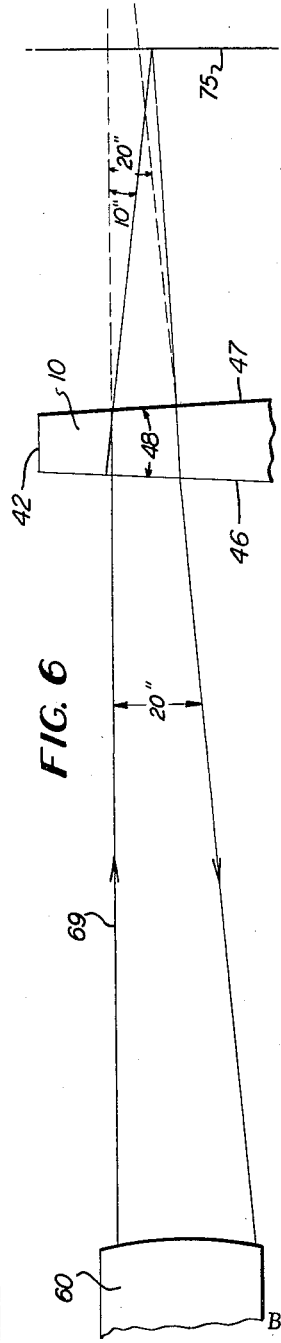
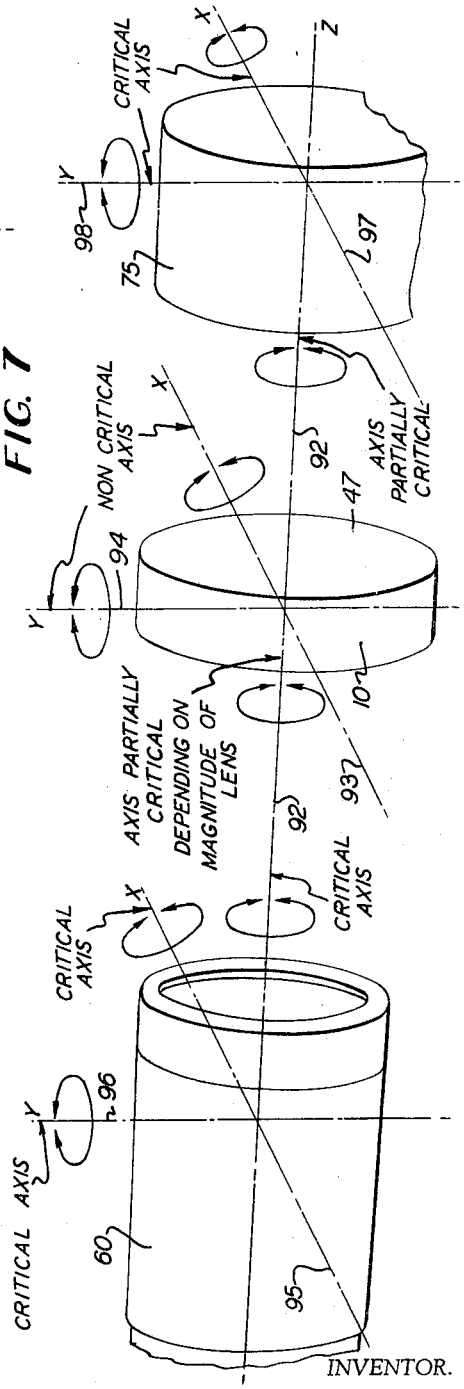
INVENTOR.
RICHARD L. SCHROEDER

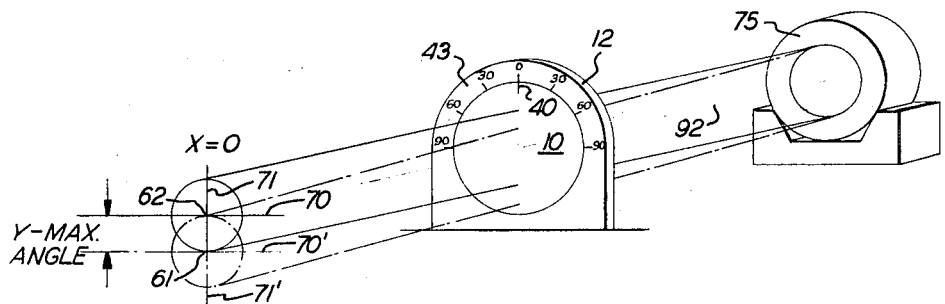
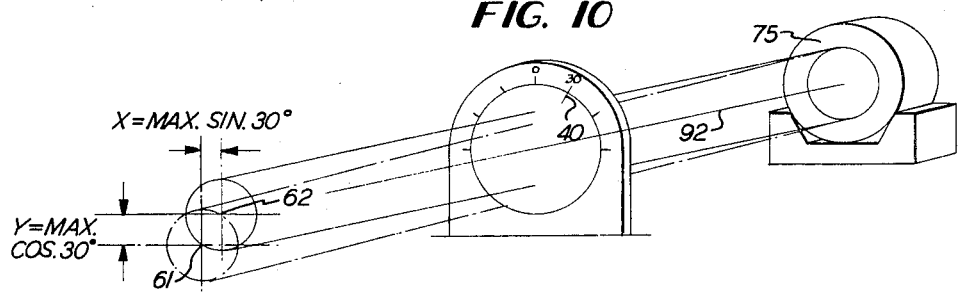
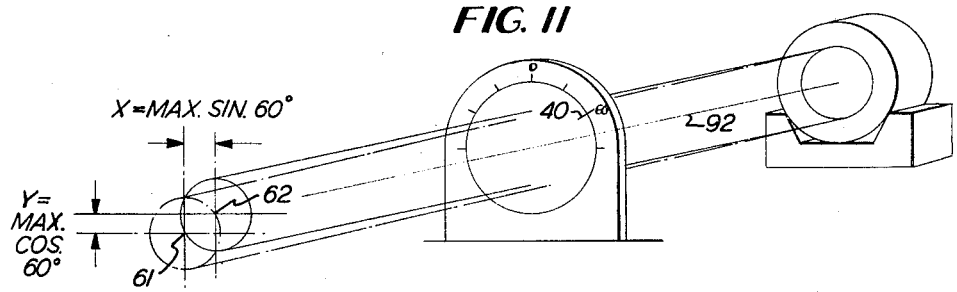
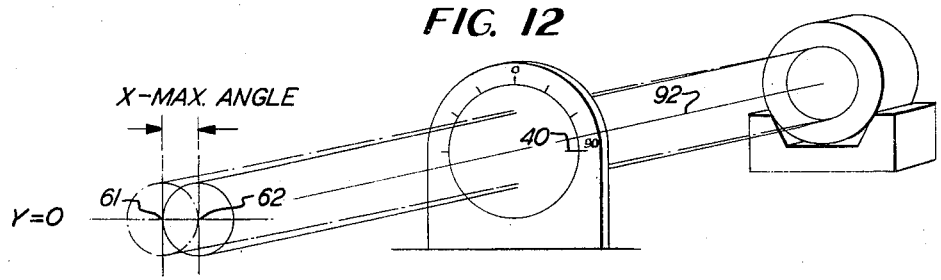
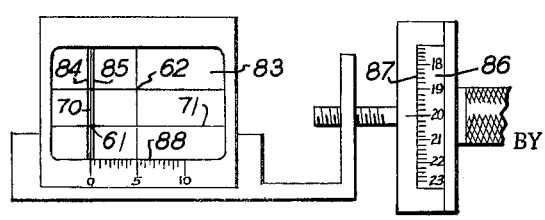

United States Patent Office 3,508,832
Patented Apr. 28, 1970

3,508,832
ANGLE GENERATING SYSTEM
Richard L. Schroeder, Newark, Ohio, assignor to Accurate Optics, Inc., Columbus, Ohio
Filed Mar. 1, 1966, Ser. No. 530,825
Int. Cl. G01c 25/00
U.S. Cl. 356—138                                 3 Claims

ABSTRACT OF THE DISCLOSURE

Apparatus for calibrating short range optical measuring instruments which measure angular displacement of reflected light rays. The apparatus includes a rotatable prism shaped lens for causing the light rays to deviate a known amount so that the resulting reflected image to the short range optical measuring instrument can be used to calibrate the instrument.

---

Figure 1:
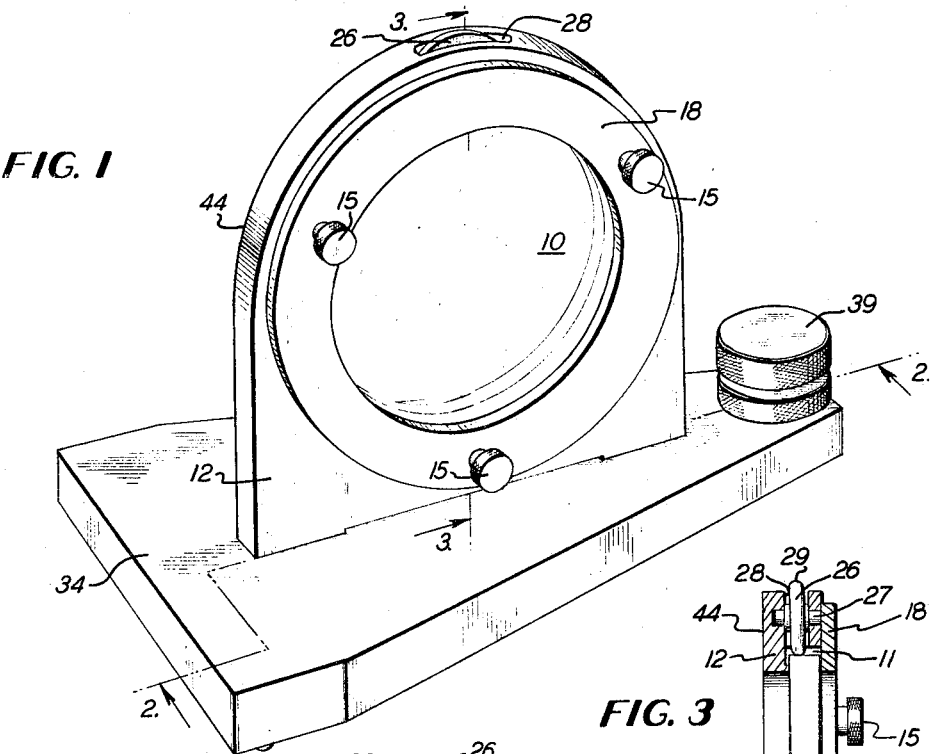

This invention relates to the calibration of optical instruments which measure angles and more particularly to an instrument which generates a very small angular displacement of a light ray for use as a comparison standard in the calibration of angle measuring instruments.

Prior art instruments for generating angular deflections of light rays for use as a comparison standard have generally used a mechanical movement to convert a relatively large movement made by the operation into a minute movement of a reflecting surface. For example, Andre R. Brault in Patent No. 3,056,207 discloses a mechanism which converts movement of a micrometer into movements of the reflecting prism sufficient to displace light only $1/10$ of an arc-second. Mechanical movements capable of such precise reduction of motion are necessarily expensive since they must include accurately made parts and must overcome the danger of slippage, wear, distortion, etc. Periodic recalibration are also necessary. These are expensive and subject the instrument to danger of injury while they are being moved to some laboratory having recalibration facilities.

A typical instrument which may be calibrated by this invention is an autocollimator, an instrument that measures angular displacements of reflected light rays to an accuracy of $1/100$ arc second, which can be used to measure the angular deviations of either a reflector surface, or some other surface on which a reflector is mounted, from a standard position. By appropriate computations and procedures linear displacements on the order of millionths of an inch can be made with this information. Instruments such as these autocollimators are ultimately calibrated against an official standard, such as that maintained by the U.S. Bureau of Standards. A series of perhaps five or six calibrations of one instrument against another, or against test standards, constitutes the chain that carries the calibration of a given instrument back to the official standard. The accuracy of any given instrument depends on the cumulative error in this chain. The cumulative error can be reduced by the use of more accurate test standards such as that of this invention. In addition, a standard which is easily calibrated and thereafter maintains its calibration for a long period of time can be used more efficiently and may permit reduction of the length of the calibration chain.

In such calibration it is desirable to be able to generate angular displacements of light which are both relatively large and relatively small as compared to the range of the tested scale. For example, in calibrating a scale that covers 60 arc seconds an angle generator that produces a highly accurate 30 arc second angle is useful to test the magnitude accuracy of the scale range from 0 to 30 and 30 to 60 arc seconds; if it can also produce an angle of $1/100$ arc second, it can be used to test the linearity (or evenness of spacing) of scale spacings corresponding to fractions of seconds.

Among the objects of this invention are the provision of an optical testing device for producing angular deflections of light rays:

(1) With which accurate angular displacements of as little as $1/100$ of an arc second may be generated.

(2) Which can generate both relatively small angular displacements on the order of $1/100$ of a second and relatively large angular displacements of a number of seconds, minutes, or degrees.

(3) Whose accuracy can be periodically verified at the point of use without the necessity of recalibration with expensive instruments and time consuming procedures.

(4) With which an input motion of an operator can produce an angular displacement of substantially less magnitude without any necessity for the use of an intermediate mechanical movement to reduce the motion.

Figure 2:
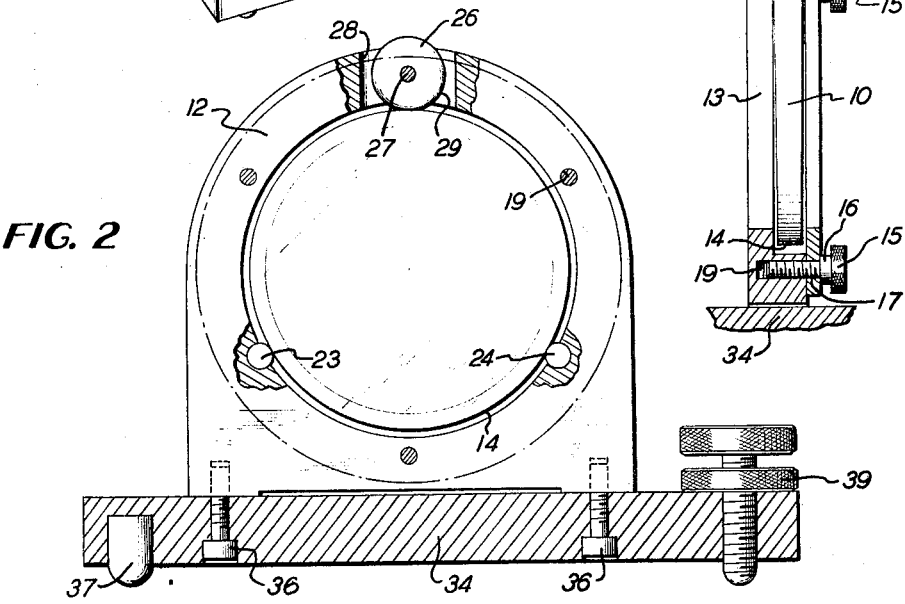
Figure 3:
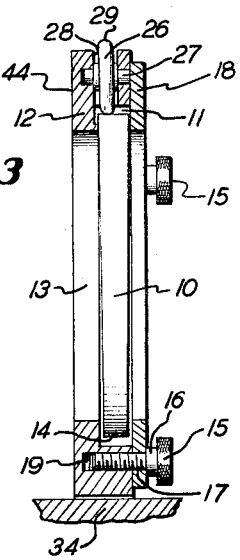
Figure 4:
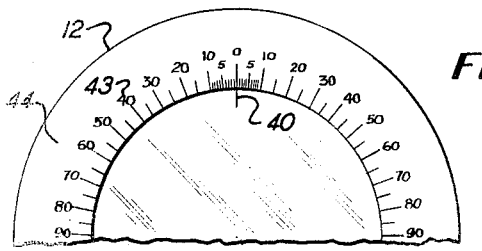

These and other objects of the invention will be apparent from the following description taken in conjunction with the accompanying drawings in which;

FIG. 1 is a perspective of an angle generator according to the present invention;

FIG. 2, a section on the line 2—2 of FIG. 1;

FIG. 3, a section on the line 3—3 of FIG. 1;

FIG. 4, a fragmentary illustration of a portion of the angle generating instrument illustrating a lens angular positioning scale carried on the frame on the side of the instrument opposite to that shown in FIG. 1;

FIG. 5, a section, partially schematic, illustrating the use of the angle generating instrument in calibrating an autocollimator;

FIG. 6, a schematic illustration of the bending of light rays by the wedge shaped lens of the present invention in calibrating the instrument illustrated in FIG. 5;

FIG. 7, a perspective illustrating the critical axes of instruments used during the calibration process of FIG. 5;

FIG. 8, a section on the line 8—8 of FIG. 5 illustrating the micrometer position and the image seen within the eye piece of an autocollimator during the calibration process illustrated in FIG. 5;

FIGS. 9 to 12, perspectives, schematic in natures illustrating the displacement in a horizontal and in a vertical plane of an image by an angle generating instrument of the present invention in various angular positions of the lens.

Briefly stated, in accomplishing the objects desired, a prism-like wedge lens having flat angularly related surfaces with the same light bending qualities as a prism is used as a comparison standard to calibrate an angle measuring instrument. The wedge lens used is shaped to displace light a precisely known amount, measured in seconds, minutes, or degrees of arc. The lens, however, can be used for testing angles very much smaller than this, for example, on the order of $1/100$ of a second by rotating it as taught by this inveniton.

As an example, a wedge lens that displaces a light beam 60 arc seconds is rotatably mounted so that the direction of light displacement may be rotated in a plane perpendicular to the central axis of an angle measuring instrument being calibrated. The angle measuring instrument is arranged to measure angular deflections in a vertical direction only. Rotation of the wedge lens rotates a displaced light image from a point where the full 60 seconds of light deflection is vertical to a point where the full 60 seconds of deflection is horizontal. The angle measuring instrument can measure the vertical component of this deflection at any intermediate point between the vertical and the horizontal. If the wedge lens is positioned so that the vertical deflection is a full 60 seconds, and it is then rotated 1°, the vertical component of the displacement only changes to 59.9910″. This is a change of less than 1/100 of an arc second. At 10° the change is only 0.9114 arc seconds. These small changes of the vertical component of displacement with small rotational angles can be used to test the accuracy of an instrument which measures small displacements in this range.

Referring to the drawings, FIG. 1, a prism shaped wedge lens 10 is mounted in a recess 11 in an aluminum frame 12 having a circular opening 13 therein. Thumb screws 15 having shoulders 16 are threaded through openings 17 in an annular bezel plate 18 and holes 19 in frame 12 to clamp lens within the recess. Ball bearings 23 and 24 support the peripheral edges 14 of lens 10 for rotation within the recess. A rubber roller 26 is mounted on a shaft 27 in an opening 28 at the top of the frame 12. The periphery 29 of the roller extends above the top surface 32 of the frame and into the recess to engage the peripheral edge 14 of the wedge shaped lens. Accordingly, rotation of the roller 26 rotates lens 10.

Lens 10 carries an etched mark 40 located on one of its flat surfaces 41 at its thinnest point 42. Frame 12 carries an angular measuring scale 43 on its side 44 opposite the recess. The zero mark of the scale 43 is located at a point directly above the center of circular opening 13. The scale is calibrated in single degrees in the range of 0 to 10 degrees on both sides of the zero mark and in 5 degree increments to 90 degrees.

Frame 12 is mounted on a base plate 34 which is roughly triangular in shape by threaded fasteners 36. Two legs 37 support the wider end 35 of base plate 34 and a threaded leg 39 supports its apex. Adjustment of leg 39 permits limited rotation of frame 12 and measuring scale 43 about an axis through the center of lens 10.

Lens 10 is made of high quality optical glass, for example, Boro Silicate Crown, homogeneous to two microns or less. It is stress relieved before grinding. A typical lens is a diameter of 3.620 inches and a thickness of 0.32 inches. Flat surfaces 46 and 47 of this lens are ground flat to a maximum deviation of 0.1 angstrom unit per inch and the angle 48 between its faces 46 and 47 is 30 seconds. Other lenses of a set have been made to the same specifications but have angles 48 of 60″, 2′30″, 7′30″ and 15′.

After manufacture the lens is placed in frame 12 and the maximum displacement angle is determined by measurement with an instrument such as an autocollimator of known accuracy, for example, one which has been recently calibrated by the U.S. Bureau of Standards.

The operation of the device can best be understood by reference to FIGS. 5–8 which illustrate the use of the present invention to calibrate an autocollimator 60. This autocollimator is a known instrument which projects parallel light rays. The instrument includes a light source 63, a condenser lens 64, and a beam splitter 65 which reflects light rays 66 from the light source 63 towards cross hair target 62 but nevertheless, permits passage of light therethrough to eye piece 67. An objective lens 68 bends light rays 66 into light rays 69 which are parallel to a high degree of accuracy.

Light rays 69 thereafter pass through wedge lens 10 which bends them and strike a reflector 75 and are reflected back through wedge lens 10 where they are bent a second time and back through objective 68 of the autocollimator. In the example illustrated in FIG. 6 and FIG. 8, the light rays are bent 10 arc seconds during each passage through the lens for a total deflection of 20 arc seconds.

The autocollimator, the angle generator, and the reflector are all mounted on a "C" grade surface plate 78 of a sufficient mass to minimize disturbances during the calibration process. "C" grade flatness is sufficient to guarantee smoothness of mounting.

The reflector 75 should be a high quality mirror having a flatness better than ¼ angstrom unit per inch of reflector diameter. The reflector diameter should be at least ½ inch larger than the diameter of the objective lens 68 of the autocollimator 60. It should have a sufficiently rigid mounting to insure stability of the reflector in relation to the test surface so that undesired angular displacements of the return image are not created during the calibration process.

In the autocollimator they pass back through the beam splitter 65 and through objective lens 68 and 80 and focused to form a visible image 61 of the target cross hairs 62 in focusing plane 82 from which point they can be viewed through eye piece 67. A graticule 83 is mounted for movement in focal plane 82 and it carries thereon two fine lines 84 and 85. A micrometer mechanism 86 having a drum scale 87 moves the graticule 83 in the focal plane 82 in a direction in which angular deflection is to be measured. The micrometer is used to move the fine lines 84 and 85 to a position at which they straddle a hair line of the return image 61 of the cross hair target 62 and are aligned with points on a fixed scale 88 mounted within the autocollimator viewing field. FIG. 8 illustrates the micrometer as indicating a displacement of 20 seconds, the same amount produced by the lens of FIG. 7.

FIGS. 9 to 12 illustrate the variation in the vertical component of the angular displacement in the horizontal and in the vertical directions which occur as the wedge lens 10 is rotated about its own central axis 92. In FIG. 9 indicator marker line 40 on lens 10 is aligned with the 0° marker of measuring scale 43 and the thickest portion of the prism lens is at the lowermost portion. A prism deflects light towards its thickest position. Accordingly, the horizontal cross hair return image 70′ of the target image 61 is displaced downward in the vertical or "y" plane to its maximum extent. The vertical cross hair image 71′ is not displaced at all and is aligned with the actual vertical cross hair 71 when viewed through eye-piece 67.

In FIGS. 10, 11, and 12 lens 10 has been rotated 30, 60, and 90 degrees respectively and prism lens marker 40 is aligned with the 30, 60, and 90 degree markers respectively on angular measuring scale 43. The image 61 is displaced both in the horizontal and in the vertical directions. It can be mathematically demonstrated that the amount of the vertical displacement "y" in each case is equal to the value of the maximum angular displacement caused by the lens multiplied by the cosine of 30, 60, or 90 degrees respectively. The horizontal displacement "x" is equal to the maximum angular displacement multiplied by the sine of 30 degrees.

The following table indicates the angular deflection "y" of an image as measured in the vertical plane caused by rotation of a wedge lens 10 shaped to give a maximum angular deflection of 60″. The change of deflection obtained by rotation from the maximum vertical deflection position where marker 40 is aligned with the 0° position on scale 43 is particularly significant.

| Degrees | Cosine | Angular defl. with 60″ max. defl. lens | |
|---|---|---|---|
| | | Absolute deflection | Change by rotation |
| 0 | 1.000 | 60.0000″ | |
| 1 | .9985 | 59.9910″ | 0.0000″ |
| 2 | .99939 | 59.9634″ | 0.0366″ |
| 10 | .98481 | 59.0886″ | 0.9114″ |
| 30 | .8660 | 51.96″ | 9.04″ |
| 60 | .5000 | 30.00″ | 30.00″ |
| 89 | .0175 | 0.5250″ | 59.4750″ |
| 90 | .0000 | 0.0000″ | 60.0000″ |

This table shows that rotation of the wedge lens 10 from 0°–1° produces a deflection of less than 1/100 of an arc second whereas rotation from 89° to 90° produces a deflection of more than ½ of a second. Rotations of the lens of amounts up to 10° are therefore highly useful in producing relatively small angular displacements; while rotations of a full 90° are useful in producing relatively larger angular displacements.

The smaller angular displacements are particularly useful for testing the linearity of an angle measuring instrument such as autocollimator 60 which measures angles to an accuracy to 0.01 arc seconds. Linearity refers to the quality of a scale by which equal scale divisions represent equal quantities. The larger angular displacements are particularly useful for testing such a scale for magnitude accuracy. Magnitude refers to the accuracy of a substantial numerical range of the scale, for example, whether the distance between a 0″ marker and a 60″ marker truly covers 60 arc seconds. An appropriate rotational angle for generating a displacement of one or two seconds on the lens is then in approximate alignment with the any desired scale spacing.

In calibrating an autocollimator scale by the method illustrated in FIGS. 5 to 8, the return image 61 of a cross hair is moved to its maximum vertical deflection by appropriate rotation of the wedge lens 10. The marker 40 on the lens is then in approximate alignment with the zero degree marker of scale 43. The best alignment possible of marker 40 and the zero indication in the scale with the vertical displacement at its greatest extent is made by adjustments of the lens frame leveling leg 39 and readjustments of the rotational position of wedge lens 10. The error of perhaps a fraction of a degree introduced by alignment by eye does not significantly affect the accuracy of the angular displacement generated by the wedge lens since the change of the cosine function is so small for one degree change in rotational position. Inspection of the above table will verify this. Lines 84 and 85 are moved to straddle the horizontal hairline of the return image 61 with the micrometer drum scale 87 and fixed scale indicating a desired value, for example, 0°0′0.00″. The position of the image 61 is best manipulated in a vertical plane by adjustments of the front threaded leg 39 of the base plate 34.

Wedge lens 10 is then rotated a desired amount, for example 1°, by adjustment of roller 26. Assuming that a 60″ maximum deflection wedge is used, a vertical angular displacement of 0.9 hundredths of an arc second results. This is compared to that indicated by micrometer drum scale 87 and fixed scale 88 after moving fine lines 84–85 on graticule 83 to straddle the new horizontal cross hair position.

To measure large angular deflections, the wedge lens 10 is rotated until a position of minimum image deflection is located. The front threaded leg 39 is adjusted to bring image 61 between the two parallel fine lines 84–85 with the micrometer 86 set at some desired position. After the image has been positioned as desired, wedge lens 10 is rotated until a maximum deflection is reached. This deflection is known and is compared with that indicated by the collimator scale.

Normally, a collimator scale is tested with a wedge lens that generates a maximum angular deflection of one half the scale range of the collimator being tested. For example, a 30″ max. deflection wedge is used with a scale having a 60″ range. Angles larger than the maximum lens deflection can be generated by first moving the image from a zero point to its maximum deflection by rotation of the lens. The lens is then removed and the threaded leg 91 is then adjusted until image 61 is brought in visual alignment with target cross hairs 62, thus changing the attitude of the collimator by the same amount as the lens maximum displacement. The lens is then reinserted and the angular deflections thereby created are measured. The displacement from the zero point is then equal to the maximum deflection of the lens plus the quantity indicated by the new rotational position of the lens.

Conventional calibration, recording, charting, and averaging procedures are followed at each step and collimator readings are tested against different angles generated by one or more wedge lenses in one or more rotary positions.

Multiple readings are made, deflections being measured with opposite rotations of the wedge lens.

The above examples are illustrative of the use of the angle generating instrument of the present invention. Many other uses will suggest themselves to persons skilled in the art of calibrating optical instruments.

From time to time the flatness of both surfaces 46 and 47 of the wedge lens is tested with an optical flat (not shown). If the lens has become distorted so as to change the angular deflection generated by the lens one or both surfaces 46 and 47 will have become curved, and visible color bands can then be seen through the optical flat if appropriate optical techniques are followed.

Some of the complexities of the positioning of the collimator, the wedge lens 10 and the reflector 75 during the calibration process of FIG. 5 can be appreciated by reference to FIG. 7 and with an understanding of the material previously explained.

The rotational position of lens 10 about its central horizontal axis 92 is critical since the variations of the rotational position of the lens vary the angular displacement of the image as explained before. While this rotational position is critical, a deviation of a few arc minutes from the desired angular position does not introduce any significant error. As will be noted from the previous table angular displacements on the order of only $\frac{1}{100}$ of a second are introduced by rotating the wedge lens by 1° when the rotational position angles are small.

Positioning of wedge lens 10 about axis 93, the horizontal axis which is perpendicular to axis 92 and which runs substantially midway between the flat surfaces 46 and 47 of wedge lens 10, is not critical. The reason is that wedge lens 10 produces substantially the same angular deflection with varying positions of the lens about this axis. The same is true of the positioning of the lens about the vertical axis 94 through the center of wedge lens 10.

The position of the autocollimator 60 about all three of the comparable axes is critical. Its position about the central horizontal axis 92 is critical because such positioning errors introduce the same variation in angular deflection as are caused by a comparable rotation of wedge lens 10. Its position about its transverse horizontal axis 95 and its vertical axis 96 is also critical because any deviations during the calibration process generate an additional angular deflection of unknown magnitude. Movements of only a few minutes of arc could so vary the position of return image 61 that it would be outside the range which the autocollimator measures.

Similarly errors of positioning of reflector 75 about its transverse horizontal axis 97 or it vertical axis 98 introduce the same errors in angular deflection as do similar movements of the autocollimator. The position of reflector 75 about its central horizontal axis 92 would not be critical if it were practical to position the reflector surface so that it was perfectly perpendicular to central axis 92. In such a case, rotation would not change the image position. However, since as a practical matter the reflecting surface is not perfectly perpendicular, the position of the reflector about central axis 92 is partially critical since variations will undesirably move the image as seen in the autocollimator.

Surface plate 78 has sufficient mass and smoothness to guarantee that the autocollimator and the reflector do not move about these critical axes during the measurement process.

It will be readily apparent that an angular generating device has been provided which is capable of generating very small angular displacements accurate to the range of .001 arc second, and that are readily checked for continued accuracy by testing of the flatness of the prism lens surfaces by conventional means.

It will be obvious to one skilled in the art that various changes may be made in the invention without departing from the spirit and scope thereof and, therefore, the invention is not limited by that which is illustrated in the

What is claimed is:

1. An independent apparatus selectively located between an optical angle-measuring instrument and an image reflector and usable for calibrating the optical instrument, said apparatus comprising a base having upper and lower surfaces, a plurality of feet extending downwardly from the lower surface of said base for supporting said base on a fixed member, at least one of said feet being adjustable, a frame mounted on the upper surface of said base and extending upwardly therefrom along a substantially vertical plane, said frame having an opening extending therethrough on an axis normal to the plane of said frame, a recess extending inwardly from one side of said frame generally concentric with said opening, an annular plate mounted on said frame adjacent to said recess, said plate having an opening of a size substantially equal to the opening in said frame and disposed generally along the same axis, a cylindrical prism-shaped wedge lens mounted within said recess between said frame and said plate, anti-friction means carried by said frame in a position to rotatably support said lens, means rotatably mounted on said frame and having portions frictionally engaging said lens for selectively rotating the same about said axis, and cooperating indicator means on said frame and said lens for indicating the amount of rotation of said lens, whereby said lens will deflect a beam of light from the optical angle-measuring instrument for calibrating the instrument.

2. The structure of claim 1 in which the cooperating indicator means includes a scale fixed on said frame and an etched mark on said lens located adjacent to the periphery of the thinnest portion of said lens.

3. The structure of claim 1 in which the opposite faces of said wedge lens are flat to one-tenth of an angstrom unit per inch.

References Cited

UNITED STATES PATENTS

| | | | |
|---|---|---|---|
| 2,563,780 | 8/1951 | Fontaine. | |
| 2,737,722 | 3/1956 | Keim | 33—46.2 |
| 2,797,485 | 7/1957 | Lewis | 33—46.2 |
| 2,880,644 | 4/1959 | Brockway et al. | |
| 3,068,740 | 12/1962 | Argyle | 350—6 X |
| 3,124,880 | 3/1964 | Rantsch. | |
| 3,279,070 | 10/1966 | Blount et al. | 33—46.2 |
| 3,326,076 | 6/1967 | Burg. | |
| 3,381,133 | 4/1968 | Barnes et al. | 250—203 |
| 2,870,671 | 1/1959 | Falconi | 250—220 |

OTHER REFERENCES

Taylor-Hobson, Type "B" Autocollimator, Taylor, Taylor & Hobson, Ltd., London, June 1957, p. 2.

RONALD L. WIBERT, Primary Examiner

J. ROTHENBERG, Assistant Examiner

U.S. Cl. X.R.

350—285, 287